United States Patent
Audic et al.

(10) Patent No.: US 7,394,995 B2
(45) Date of Patent: Jul. 1, 2008

(54) SYSTEM AND METHOD FOR A COMPACT OPTICAL RECEIVER WITH WIDE DYNAMIC RANGE

(75) Inventors: Emmanuel Audic, Nozay Cedex (FR); Franck Deblock, Nozay Cedex (FR); Elisabeth Leclerc, Nozay Cedex (FR); Gilles Sorhouetgary, Nozay Cedex (FR); Alexandre Sherr, Nozay Cedex (FR); Henri Jean Egger, Nozay Cedex (FR)

(73) Assignee: Avanex Corporation, Fremont, CA (US)

( * ) Notice: Subject to any disclaimer, the term of this patent is extended or adjusted under 35 U.S.C. 154(b) by 658 days.

(21) Appl. No.: 10/817,105

(22) Filed: Apr. 1, 2004

(65) Prior Publication Data

US 2005/0226640 A1    Oct. 13, 2005

(51) Int. Cl.
*H04B 10/06* (2006.01)
(52) U.S. Cl. .............. 398/202; 398/208; 398/209; 398/210; 398/212; 398/213; 398/214; 398/92; 398/157; 398/160; 398/94; 398/135; 398/136; 398/173; 398/177; 398/158; 398/82; 398/97; 398/33; 398/37; 398/38; 359/341; 359/337; 250/214 A; 250/214 AG
(58) Field of Classification Search ............. 398/202, 398/208, 209, 210, 212, 214, 213, 157, 135, 398/136, 137, 139, 92, 33, 37, 38, 173, 177, 398/158, 160, 82, 94, 97; 359/341, 337; 250/214 A, 214 AG
See application file for complete search history.

(56) References Cited

U.S. PATENT DOCUMENTS

| | | | | |
|---|---|---|---|---|
| 5,335,109 | A * | 8/1994 | Heidemann | 359/341.41 |
| 5,517,351 | A * | 5/1996 | Hatakeyama | 359/341.41 |
| 5,710,660 | A * | 1/1998 | Yamamoto et al. | 359/341.44 |
| 5,854,704 | A * | 12/1998 | Grandpierre | 398/202 |
| 6,057,951 | A * | 5/2000 | Sugawara | 398/209 |
| 6,490,080 | B2 * | 12/2002 | Cornelius et al. | 359/341.41 |
| 6,522,459 | B1 | 2/2003 | Pease et al. | |
| 6,522,461 | B1 * | 2/2003 | Cornelius et al. | 359/341.44 |
| 2002/0071164 | A1 | 6/2002 | Lange et al. | |
| 2002/0080475 | A1 | 6/2002 | Cornelius et al. | |
| 2005/0031355 | A1 * | 2/2005 | Shi et al. | 398/147 |

OTHER PUBLICATIONS

EP Search Report, Application No. EP 05-30 0232, dated Feb. 10, 2006.

* cited by examiner

*Primary Examiner*—Hanh Phan
(74) *Attorney, Agent, or Firm*—Patterson & Sheridan, LLP

(57) ABSTRACT

An optical receiver is disclosed comprising an erbium-doped fiber amplifier (EDFA) that is coupled to a photodiode and transimpedance amplifier without filtering output light signal in the EDFA. Optionally, a clock/data regenerator can be coupled to the electrical output of the transimpedance amplifier for compensating for noise distortion and timing jitter for affecting the control loop feeding back for adjusting the electrical current into a pump laser of an optical pre-amplifier. Furthermore, the optical receiver of the present invention can also be implemented in a transponder.

21 Claims, 6 Drawing Sheets

SYSTEM AND METHOD FOR A COMPACT OPTICAL RECEIVER WITH WIDE DYNAMIC RANGE

BACKGROUND INFORMATION

1. Field of the Invention

The invention relates generally to the field of optical components, subsystems, systems, and more particularly to optical receivers.

2. Description of Related Art

Optical receivers continue to evolve in their designs by industrial trends, market opportunities and technological innovations. Cost reductions and dimension compactness serve as major driving forces in the design of optical systems after the fallout in the telecom industry. One key parameter in an optical receiver is the dynamic range in the level of the input light power signal. The electrical output signal is correlated to the intensity of the optical input signal where the intensity of the optical input signal can fluctuate in large in the input dynamic range.

One conventional solution uses an avalanche diode (APD) and electrical transducers combination in an optical receiver. A shortcoming in this type of optical receiver that uses an APD is the limit in gain and sensitivity, which reduces the dynamic range of the optical receiver.

Accordingly, there is a need to design an optical receiver that is cost effective and optimized in size while producing a wider dynamic range and higher sensitivity.

SUMMARY OF THE INVENTION

The invention discloses an optical receiver comprising an erbium-doped fiber amplifier (EDFA) that is coupled to a PIN diode (or a photodiode) and transimpedance amplifier without filtering an output light signal in the EDFA. Optionally, a clock/data regenerator can be coupled to the electrical output of the transimpedance amplifier for compensating noise distortion and timing jitter without affecting the control loop which is fed back for adjusting the electrical current into a pump laser of an optical pre-amplifier. Furthermore, the optical receiver of the present invention can also be implemented in a transponder. In one embodiment, the optical receiver in the present invention produces a sensitivity of −29 dBm and a dynamic range of 33 dB at 10 gigabits per second (Gbps) built in Transponder MSA 300 pins standard package (in comparison with APD best solutions a sensitivity of −26 dBm and a dynamic range of 21 dB).

An optical receiver comprises an optical pre-amplifier for receiving an input light signal, the optical pre-amplifier employing no filters in the optical pre-amplifier; a PIN diode, coupled to the optical pre-amplifier, for converting the input light signal into an electrical current signal; a transimpedance amplifier, coupled to the photodiode, for converting the electrical current signal to an output electrical voltage signal; and a control loop, coupled to the transimpedance amplifier, for adjusting the optical signal generated by the pre-amplifier relative to the electrical voltage signal generated by the transimpedance amplifier.

Advantageously, the present invention reduces the cost significantly in the design of an optical receiver by eliminating carrier filter in the optical pre-amplifier.

Other structures and methods are disclosed in the detailed description below. This summary does not purport to define the invention. The invention is defined by the claims.

DETAILED DESCRIPTION OF PREFERRED EMBODIMENTS

Figure 1:
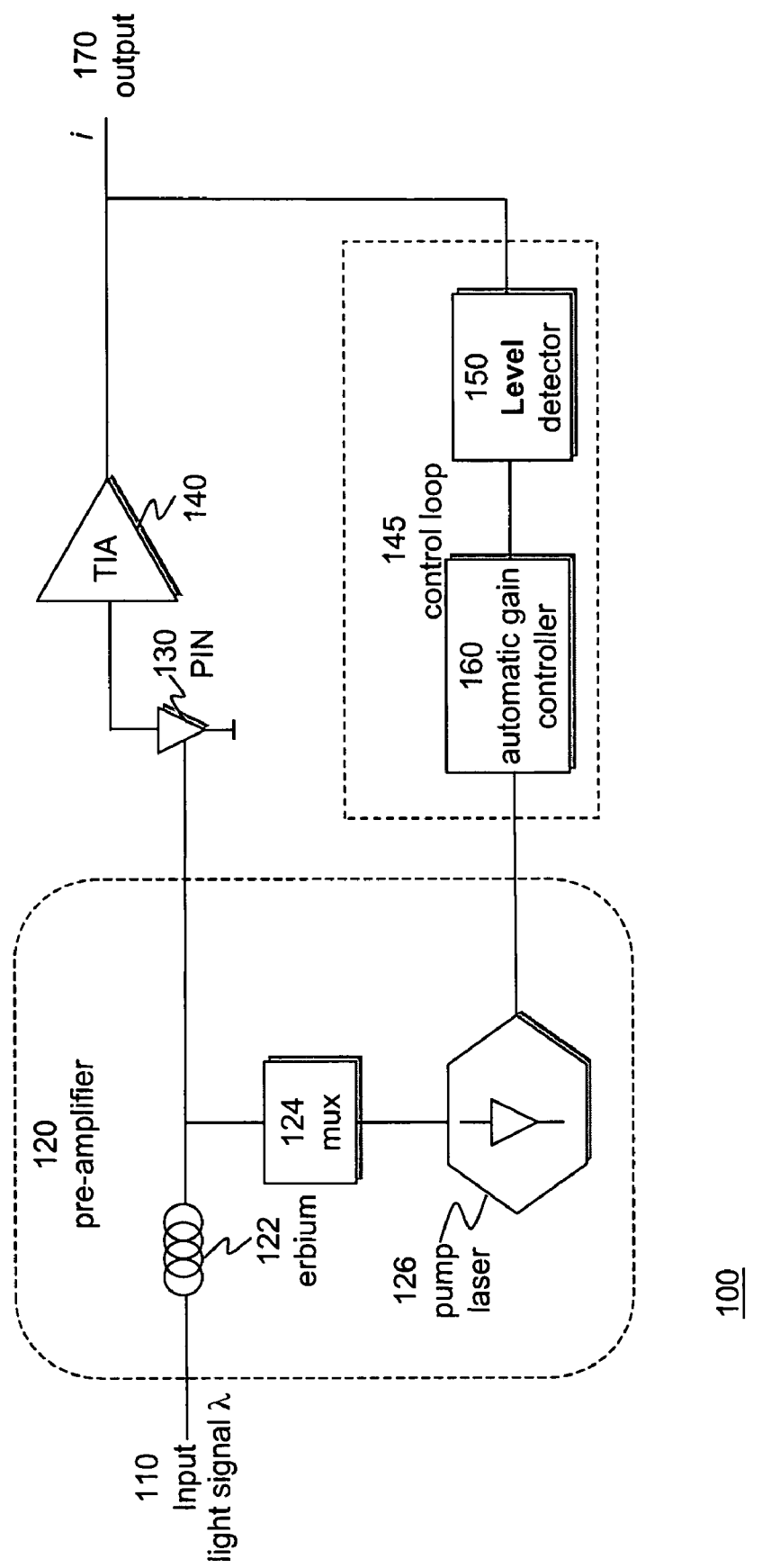
FIG. 1 depicts a structural diagram illustrating a first embodiment of an optical receiver without employing carrier filter in accordance with the present invention.

FIG. 1 depicts a structural diagram illustrating a first embodiment of an optical receiver 100 without employing filters. The optical receiver 100 comprises an optical preamplifier 120 for receiving a light signal 110 λ, a PIN diode (or a photodiode) 130, a transimpedance amplifier (TIA) 140 for generating an output electrical voltage 170. The output voltage 170 is fed back to the pre-amplifier 120 by a peak or average detector 150 and an automatic gain controller (AGC) 160.

The pre-amplifier 120 represents a gain medium for amplifying the incoming light λ 110 in the order of approximately 30 dB to 0 dB. The optical pre-amplifier 120 comprises an erbium-doped fiber (EDF) 122 that is coupled to a 980 nm pump laser 126 through an optical multiplexer (mux) 124. As the electrical current in the pump laser 126 is increased, the gain of the pre-amplifier 120 increases. As the electrical current in the pump laser 126 is decreased, the gain of the pre-amplifier 120 decreases.

On either sides of the EDF 122, there are no carrier filter (optionally, just isolators in order to reject the 980 nm pump power and avoid optical reflection in the amplifier mean). A carrier filter typically is used to filter out the spontaneous noise (ASE) injected into the PIN diode 130. However, the utilization of such a filter in an optical receiver typically adds costs as well as increasing the dimensions in an optical receiver. The elimination of this carrier filter reduces the cost in building an optical receiver, while reducing the size of the optical receiver.

The PIN diode 130 receives the amplified light signal λ 110 from pre-amplifier 120 and converts it into an electrical current signal. The TIA 140 converts the electrical current received from the PIN diode 130 into an electrical voltage signal 170.

On a feedback or control loop 145, the peak or average detector 150 determines the peak or average value of the electrical voltage signal 170 and generating the electrical voltage signal 170 to the automatic gain controller 160. The automatic gain controller 160 produces a control voltage for the pump laser 126 based on the input voltage received that corresponds to a predetermined control characteristic. An objective of the control loop 145 is to keep the PIN input light signal constant by feeding back the output electrical voltage 170 and correlating the output electrical voltage 170 to the input light power of the pre-amplifier 120, thereby allowing the gain to be adjusted in accordance with the dynamic range required for a particular application. For example, the input signal λ 110 has a dynamic range of −30 dBm to +4 dBm, with a particular input power entering the input of the PIN 130. The control loop 145 will keep the PIN input light signal constant by feeding back and correlating the output electrical voltage 170 to the input light power of the pre-amplifier 120. If the intensity of the light signal 110 propagating through the PIN diode 130 is too strong, the automatic gain controller 160 reduces the electrical current at the pump laser 126. However, if the intensity of the light signal 110 propagating through the PIN diode 130 is too dimmed, the automatic gain controller 160 increases the electrical current at the pump laser 126.

Figure 2A:
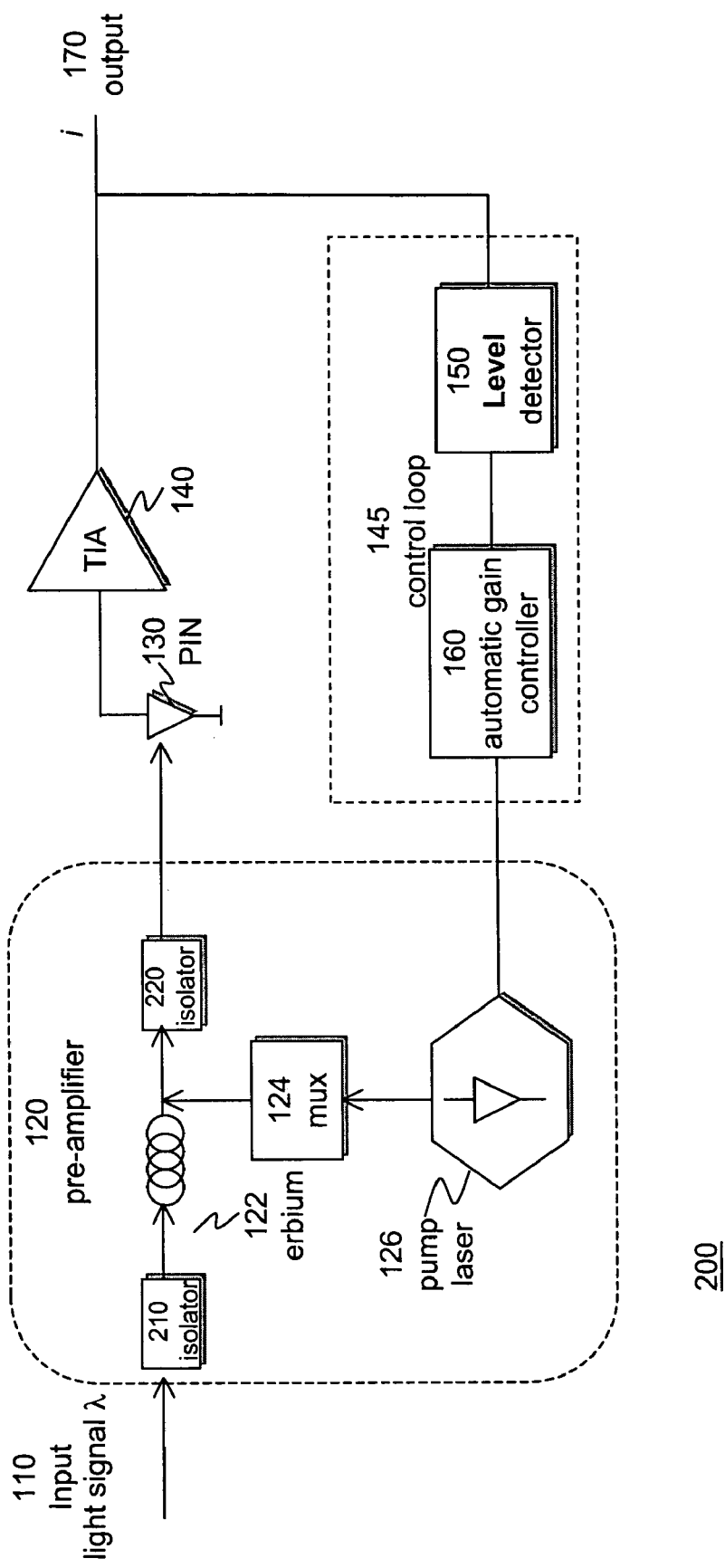
FIG. 2A depicts a structural diagram illustrating a second embodiment of an optical receiver working in backward pumping mode without employing carrier filter but with isolators in accordance with the present invention.

In FIG. 2A, there is shown a structural diagram 200 illustrating a second embodiment of an optical receiver in backward pumping mode without employing carrier filter but with isolators 210 and 220. The isolators 210 and 220 are used in order to reject the pump power (e.g. 980 nm) generated by the pump laser 126 outside the EDF 122 and to avoid optical reflection in the amplifier mean. In one embodiment, the pre-amplifier 120 receives an input signal λ 110 at the transmission rate of 10 Gpbs. The PIN diode 130 can detect a signal carrying 1550 nm or 980 nm wavelength. The first isolator 210 rejects the pump power effect generated by the pump laser 126 from exiting through the input 110 in causing disturbance outside the optical receiver (or transponder) 200. The second isolator 220 rejects the unwanted signal, e.g. 980 nm, from entering the PIN diode 130. When the optical receiver 200 is in backward pumping mode, the input light power from the input light signal λ 110 and pump light power from the pump laser 126 propagate in contrary direction. While the pump light power from the power laser 126 travels northward and then westward toward the erbium fiber 122, the input light power from the input light signal λ 110 travels eastward toward the erbium fiber 122. In this configuration, the erbium fiber 122 is placed on the left side relative to the pump light power from the pump laser 126 that passes through the mux 124.

Figure 2B:
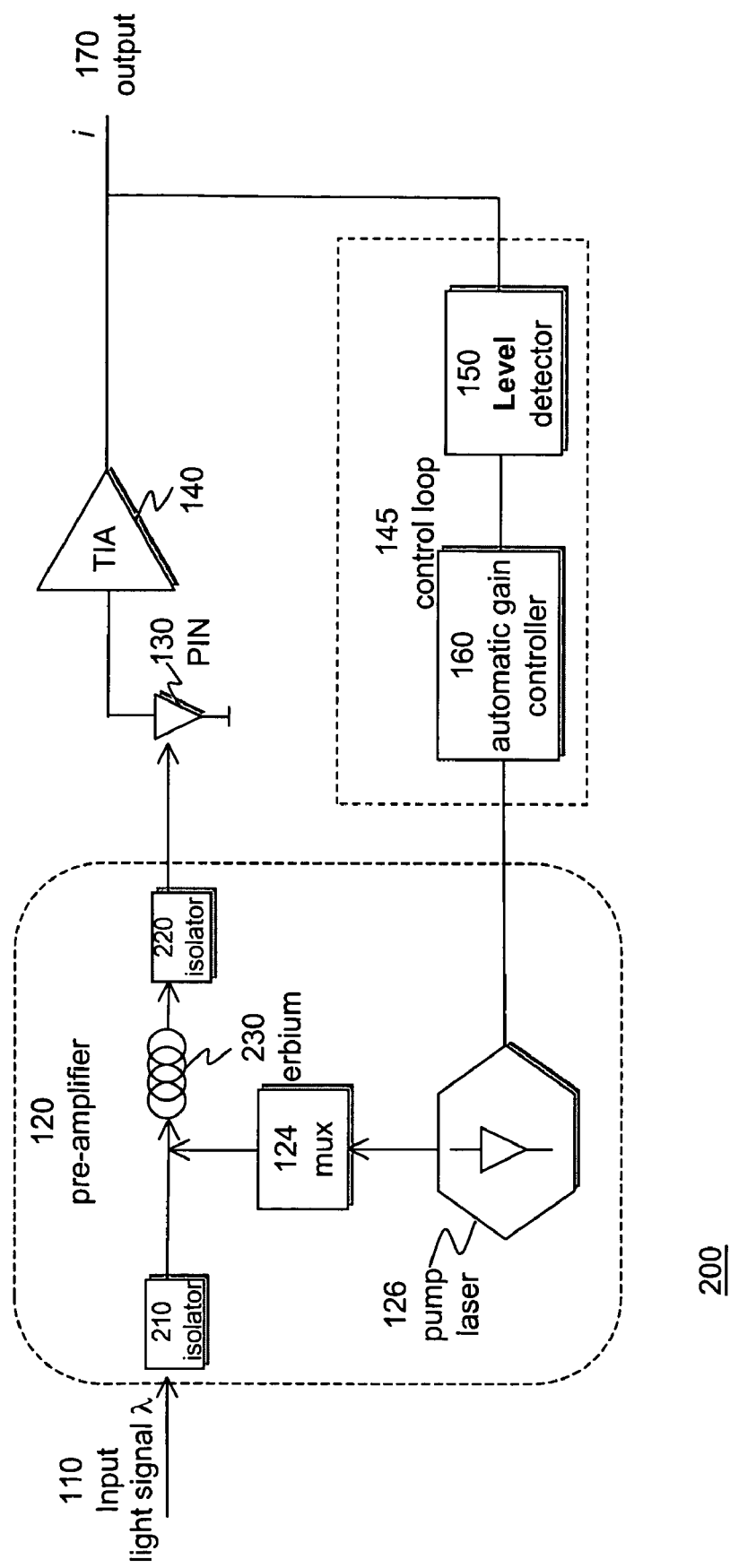
FIG. 2B depicts a structural diagram illustrating a third embodiment of an optical receiver in forward pumping mode without employing carrier filter but with isolators in accordance with the present invention.

In FIG. 2B, there is shown a structural diagram illustrating a third embodiment of an optical receiver in a forward pumping mode without employing carrier filter but with isolators. When the optical receiver 200 is in forward pumping mode, the input light power from the input light signal λ 110 and pump light power from the pump laser 126 propagate in same direction. While the pump light power from the power laser 126 travels northward and then eastward toward an erbium fiber 230, the input light power from the input light signal λ 110 travels eastward toward the erbium fiber 230. In this configuration, the erbium fiber 230 is placed on the right side relative to the pump light power from the pump laser 126 that passes through the mux 124.

Figure 3:
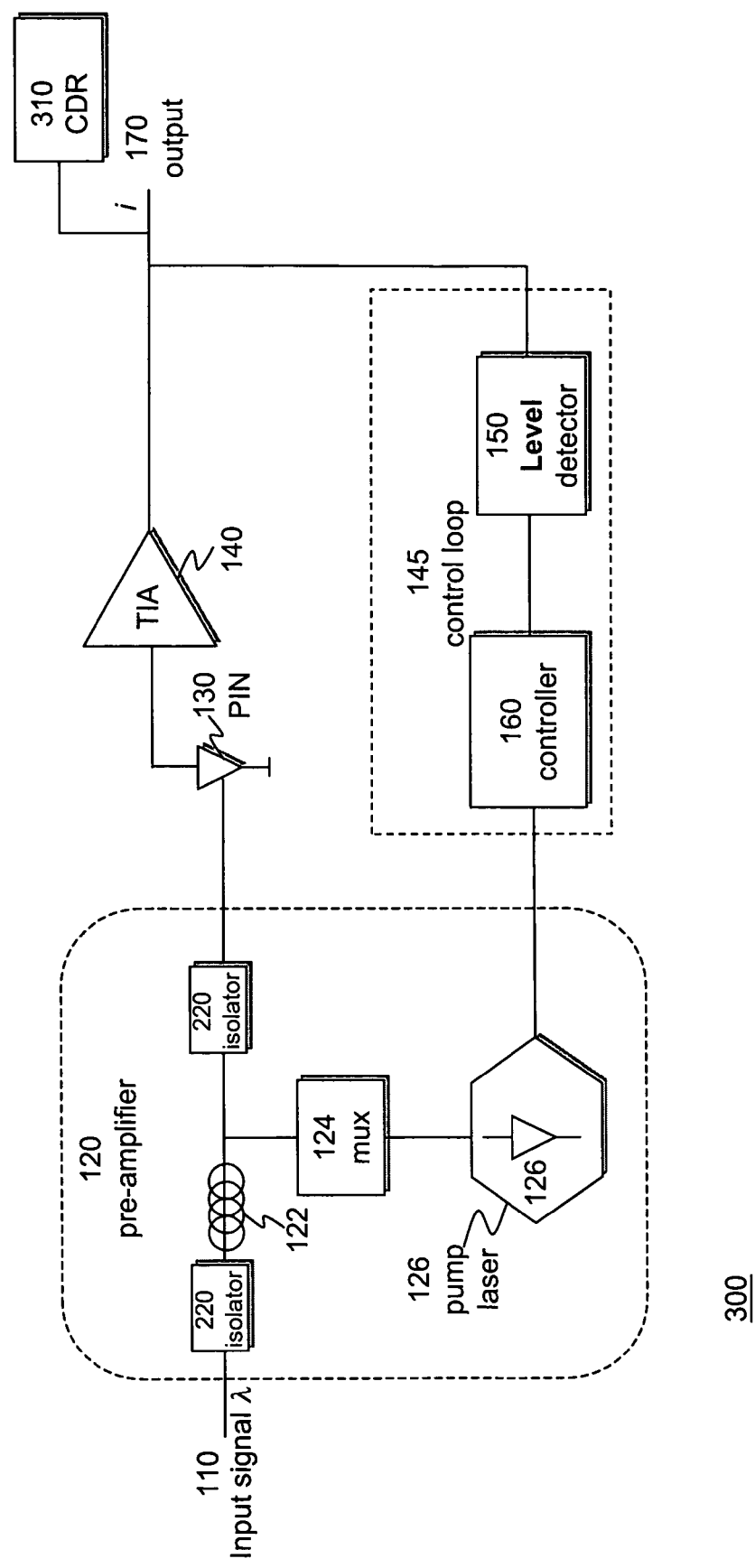
FIG. 3 depicts a structural diagram illustrating a fourth embodiment of an optical receiver without employing carrier filter with an alternative control loop in accordance with the present invention.

Furthermore, a fourth embodiment is shown in FIG. 3 that depicts a structural diagram 300 of an optical receiver without employing filters with an alternative control loop. A clock/data regenerator (CDR) 310 is coupled to the electrical output 170 and the transimpedance amplifier 140, and the control loop, i.e. the peak or average detector 150 and the automatic gain controller 160 for pre- and post-compensation for distortion and timing jitter, which ensure accurate regeneration of the output electrical voltage signal through the pump laser 126.

Figure 4:
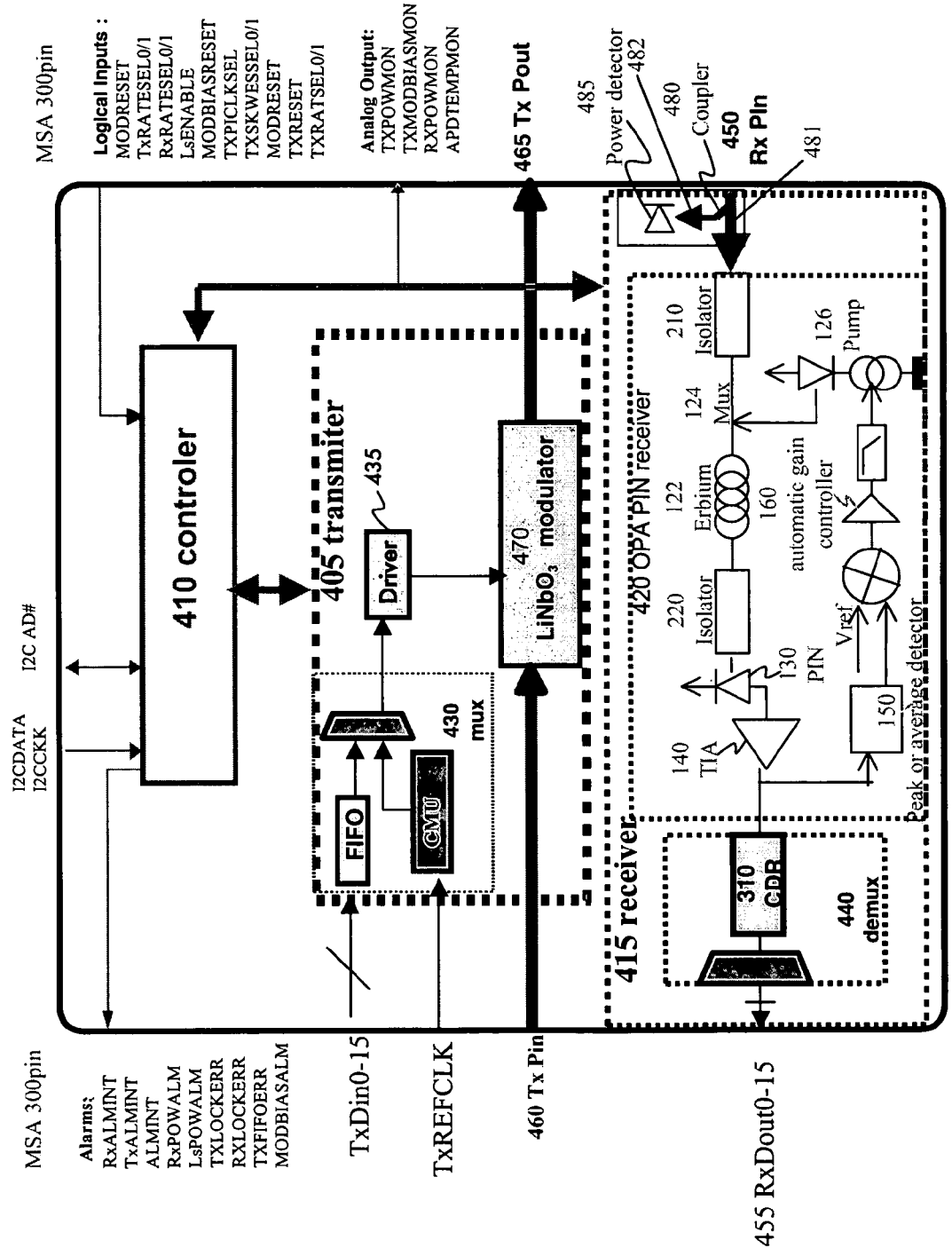
FIG. 4 depicts an architectural diagram illustrating the optical receiver implemented in a 10 Gb/s 300pins MSA transponder in accordance with the present invention.

FIG. 4 depicts an architectural diagram illustrating the optical receiver implemented in a transponder 400. The transponder 400 comprises a controller 410 coupled commonly to a transmitter 405 and a receiver 415, where the transmitter 405 having an electronic multiplexer (mux) 430 coupling to a driver 435 and a LiNbO3 modulator 470, and where the receiver 415 having an optical amplifier (OPA) PIN receiver 420 coupling to an electronic demultiplexer (demux) 440. On the receiving side, the OPA PIN receiver 420 receives an input through an Rx Pin 450, coupling and propagating through the demux 440, and generating an output to a RxDout0 pin 455. The Rx Pin 450 is further coupled to a coupler 480 and a power detector 485 in which a substantial amount of light power, e.g. 95%, flows in the direction of a thick arrow 481 to the isolator 210, while a small amount of light power, e.g. 5%, flows in the direction of a thin arrow 482 though the coupler 480 and the power detector 485. On the transmit side, the transmitter 405 receives an input through a Tx Pin 460, coupling and propagating through the LiNbO3 modulator 470, and generating an output to a Tx Pout pin 465. The OPA PIN receiver 420 can be implemented with the optical receiver 100 as described in the first embodiment, the optical receiver 200 as described in the second embodiment, or the optical receiver 300 as described in the third embodiment.

Figure 5:
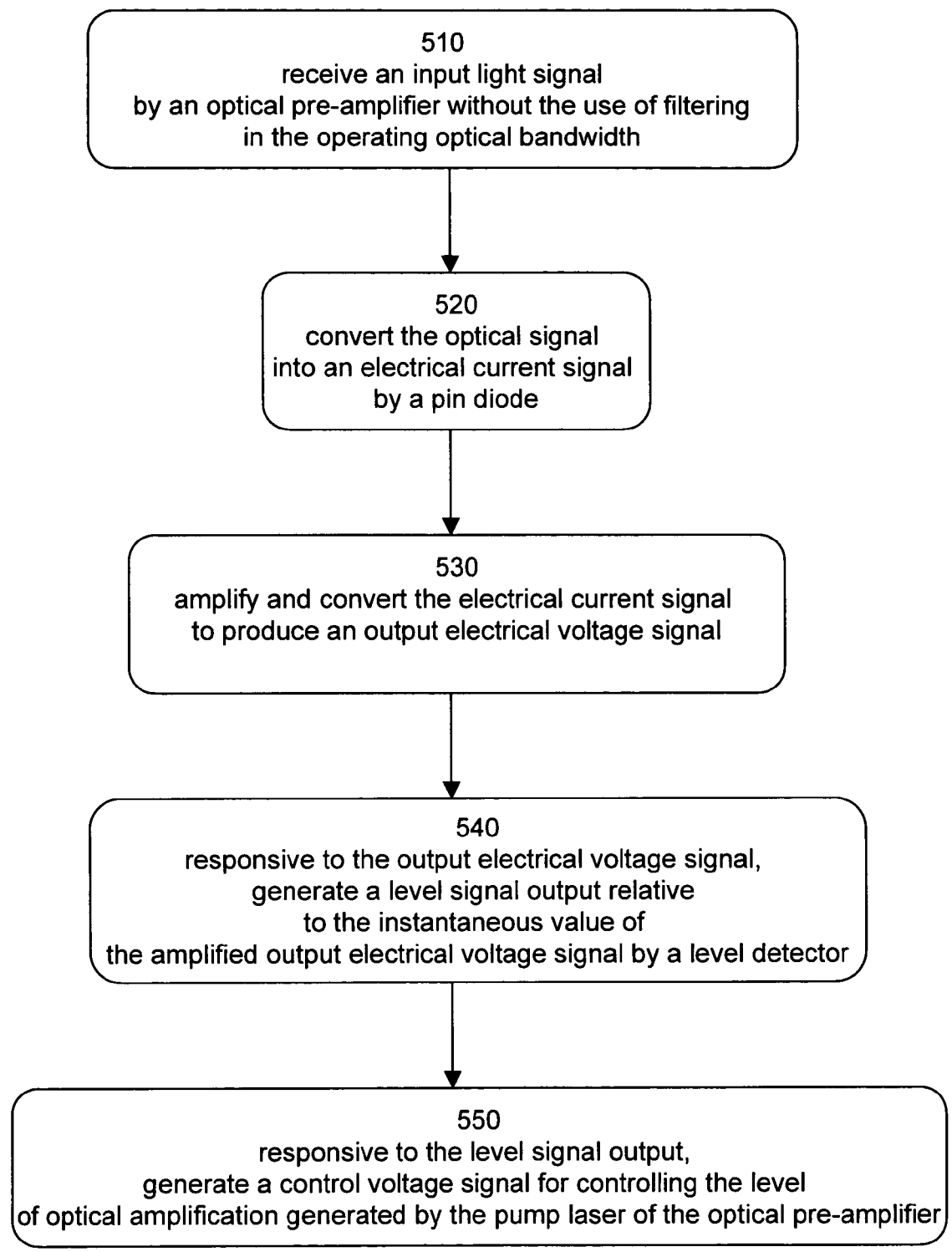
FIG. 5 depicts a flow diagram illustrating operational steps in the optical receiver without employing filters in accordance with the present invention.

FIG. 5 depicts a flow diagram 500 illustrating the first embodiment of the optical receiver without employing filters in accordance with the present invention. At step 510, the optical pre-amplifier 120 receives the input light signal λ 110 without the use of filtering in the operating optical bandwidth and generating an optical signal without the use of carrier filtering. At step 520, the PIN diode 130 converts the input light signal 110 into an electrical current signal. At step 530, the transimpedance amplifier 140 amplifies the electrical current signal and converts the electrical current signal to an electrical voltage signal 170. At step 540, in response to the output electrical voltage signal, the level detector 150 generates a level signal output relative to the peak or average value of the amplified output electrical voltage signal. At step 550, in response to the level signal output, the automatic gain controller 160 generates a control voltage signal for controlling the level of optical amplification by adjusting the pump laser 126.

The present invention is applicable to long-haul networks and ultra-long-haul networks, as well as metropolitan and regional applications and local networks. The structures, architecture and method are also applicable to a transmission rate of 10 Gbps, 40 Gbps and beyond.

Those skilled in the art can now appreciate from the foregoing description that the broad techniques of the embodiments of the present invention can be implemented in a variety of forms. For example, one of ordinary skill in the art should recognize that the EDFA can be implemented with other optical amplifier technologies, such as a semiconductor optical amplifier (SOA). Therefore, while the embodiments of this invention have been described in connection with particular examples thereof, the true scope of the embodiments of the invention should not be so limited since other modifications, whether explicitly provided for by the specification or implied by the specification, will become apparent to the skilled practitioner upon a study of the drawings, specification, and following claims.

We claim:

1. An optical receiver, comprising:
an optical pre-amplifier for receiving an input light signal, the optical pre-amplifier employing no carrier filters in the optical pre-amplifier, wherein the optical pre-amplifier includes a pair of isolators, a pump laser, and an optical multiplexer;

a photodiode coupled to the optical pre-amplifier, for converting the input light signal into an electrical current signal;

a transimpedance amplifier, coupled to the photodiode, for converting the electrical current signal to an output electrical voltage signal; and a control loop, coupled to the transimpedance amplifier and the optical pre-amplifier, for adjusting the optical signal generated by the pre-amplifier relative to the output electrical voltage signal generated by the transimpedance amplifier.

2. The optical receiver of claim 1, wherein the control loop maintains the input light signal sent to the PIN diode substantially constant by correlating the output electrical voltage signal to the intensity of the input light signal by adjusting the gain of the pre-amplifier.

3. The optical receiver of claim 1, wherein the pump laser and the optical multiplexer are coupled between an output of one isolator in the pair of isolators and an input of the other isolator in the pair of isolators.

4. The optical receiver of claim 3, wherein the pair of isolators are configured to reject pump power generated by the pump laser and substantially prevent optical reflection in the pre-amplifier.

5. A method for maintaining the intensity of an optical signal, comprising:

receiving an input light signal by a pre-amplifier, the pre-amplifier comprising a pair of isolators, a pump laser and an optical multiplexer, wherein the pair of isolators are configured to reject pump power generated by the pump laser and substantially prevent optical reflection in the pre-amplifier;

converting the input light signal into an electrical current signal by a PIN diode;

amplifying and converting the electrical current signal to produce an output electrical voltage signal without carrier filtering; and feeding the output electrical voltage signal back for maintaining the PIN input light signal substantially constant by correlating the output electrical voltage signal to the intensity of the input light signal by adjusting the gain of the pre-amplifier.

6. The method of claim 5, wherein the feeding step comprises generating a level signal output relative to the peak or average value of the output electrical voltage signal.

7. The method of claim 6, wherein the feeding step comprises generating a control voltage signal for controlling the level of input light signal generated by controlling the current of a pump laser.

8. An optical receiver, comprising:

an optical pre-amplifier for receiving an input light signal, the optical pre-amplifier employing no carrier filters in the optical pre-amplifier, wherein the optical pre-amplifier comprises a first isolator having an input and an output;

a second isolator having an input and an output;

a pump laser having an input and an output; and an optical multiplexer having an input coupled to the output of the pump laser and an output, wherein the output of the optical multiplexer is coupled between the output of the first isolator and the input of the second isolator, the first and second isolators being used in order to reject pump power generated by the pump laser and substantially prevent optical reflection in the pre-amplifier;

a PIN diode, coupled to the optical pre-amplifier, for converting the input light signal into an electrical current signal;

a transimpedance amplifier, coupled to the PIN diode, for converting the electrical current signal to an output electrical voltage signal; and a control loop, coupled to the transimpedance amplifier, for adjusting the optical signal generated by the pre-amplifier relative to the output electrical voltage signal generated by the transimpedance amplifier, wherein the control loop is configured to maintain the input light signal sent to the PIN diode substantially constant.

9. The optical receiver of claim 8 in backward pumping mode, wherein the optical pre-amplifier comprises an erbium fiber having a west end and east end, the east end of the erbium fiber coupled to the output of the optical multiplexer and the input of the second isolator, the input light signal generating an input light power that propagates in contrary direction relative to a pump light power from the pump laser.

10. The optical receiver of claim 9, wherein the control loop comprises a level detector for generating a level signal relative to the peak or average value of the output electrical voltage signal.

11. The optical receiver of claim 10, wherein the control loop comprises an automatic gain controller for generating a control voltage signal for controlling the level of optical amplification generated by adjusting the current of a pump laser in the optical pre-amplifier.

12. The optical receiver of claim 11, further comprising a clock/data regenerator coupled to the transimpedance amplifier for compensating distortion and timing jitter to ensure accurate regeneration of the output electrical voltage signal.

13. The optical receiver of claim 8 in forward pumping mode, wherein the optical pre-amplifier comprises an erbium fiber having a west end and east end, the west end of the erbium fiber coupled to the output of the optical multiplexer and the output of the first isolator, the input light signal generating an input light power that propagates in same direction relative to a pump light power from the pump laser.

14. A transponder, comprising:

a controller;

a transmitter, coupled to the controller transmitter; and a receiver, coupled to controller, the receiver having an optical amplifier receiver comprising:

an optical pre-amplifier for receiving an input light signal, the optical pre-amplifier employing no filters in the optical pre-amplifier, wherein the optical pre-amplifier comprises a first isolator having an input and an output;

a second isolator having an input and an output;

a pump laser having an input and an output; and an optical multiplexer having an input coupled to the output of the pump laser and an output, wherein the output of the optical multiplexer is coupled between the output of the first isolator and the input of the second isolator, the first and second isolators being used in order to reject pump power generated by the pump laser and substantially prevent optical reflection in the pre-amplifier;

a photodiode, coupled to the optical pre-amplifier, for converting the input light signal into an electrical current signal;

a transimpedance amplifier, coupled to the photodiode, for converting the electrical current signal to an output electrical voltage signal; and a control loop, coupled to the transimpedance amplifier, for adjusting the optical signal generated by the pre-amplifier relative to the electrical voltage signal generated by the transimpedance amplifier, wherein the control loop is configured to maintain the input light signal sent to the photodiode substantially constant.

15. The optical receiver of claim 14, wherein the control loop comprises a level detector for generating a level signal relative to the peak or average value of the output electrical voltage signal.

16. The optical receiver of claim 15, wherein the control loop comprises an automatic gain controller for generating a control voltage signal for controlling the level of optical amplification generated by adjusting the current of a pump laser in the optical pre-amplifier.

17. The optical receiver of claim 16, further comprising a clock/data regenerator coupled to the transimpedance amplifier.

18. The optical receiver of claim 16, wherein the transmitter comprises:

an electronic multiplexer having inputs for receiving a plurality of inputs and generating a multiplexed output signal;

a driver, coupled to the electronic multiplexer, for driving the multiplexed output signal from the electronic multiplexer and generating a driver output signal; and a modulator, coupled to the driver, for modulating the input light of the modulator.

19. The optical receiver of claim 16, further comprising a demultiplexer coupled to an optical amplifier PIN receiver.

20. The optical receiver of claim 16, further comprising a coupler and a power detector coupled to the input of an optical PIN receiver.

21. The optical receiver of claim 14, wherein the control loop maintains the input light signal sent to the photodiode substantially constant by correlating the output electrical voltage signal to the intensity of the input light signal by adjusting the gain of the pre-amplifier.

* * * * *